(12) United States Patent
Cheung et al.

(10) Patent No.: US 6,847,501 B2
(45) Date of Patent: Jan. 25, 2005

(54) METHOD AND APPARATUS FOR PROVIDING MATCHED DIFFERENTIAL MR BIASING AND PRE-AMPLIFICATION

(75) Inventors: Wayne Leung Cheung, San Jose, CA (US); Stephen Alan Jove, Hollister, CA (US); Kevin Roy Vannorsdel, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 266 days.

(21) Appl. No.: 10/289,076

(22) Filed: Nov. 6, 2002

(65) Prior Publication Data

US 2004/0085664 A1 May 6, 2004

(51) Int. Cl.[7] ................................................. G11B 5/09
(52) U.S. Cl. ........................... 360/46; 360/66; 360/67; 360/65
(58) Field of Search ............................... 360/46, 66, 67, 360/65; 327/52, 54, 55; 330/252, 259, 270, 285, 127

(56) References Cited

U.S. PATENT DOCUMENTS

| | | | |
|---|---|---|---|
| 4,075,671 A | 2/1978 | Cheatham et al. | |
| 4,879,610 A | 11/1989 | Jove et al. | |
| 5,204,789 A | 4/1993 | Jove et al. | |
| 5,331,478 A | 7/1994 | Aranovsky | |
| 5,534,818 A | 7/1996 | Peterson | |
| 5,701,213 A | 12/1997 | Cameron et al. | |
| 5,753,803 A | 5/1998 | Abraham et al. | |
| 5,770,968 A | 6/1998 | Cameron | |
| 5,812,019 A | 9/1998 | Ngo et al. | |
| 5,834,952 A | 11/1998 | Ngo | |
| 5,856,891 A | 1/1999 | Ngo | |
| 5,877,911 A | 3/1999 | Klaassen et al. | |
| 6,057,972 A | 5/2000 | Castellucci | |
| 6,101,056 A | 8/2000 | Klaassen et al. | |
| 6,219,194 B1 | 4/2001 | Stein et al. | |
| 6,222,415 B1 * | 4/2001 | Umeyama et al. | 330/252 |
| 6,252,735 B1 | 6/2001 | Chung et al. | |
| 6,288,863 B1 | 9/2001 | Flinsbaugh | |
| 6,341,046 B1 | 1/2002 | Peterson | |
| 6,633,446 B1 * | 10/2003 | Sako | 360/67 |

* cited by examiner

Primary Examiner—Alan T. Faber
(74) Attorney, Agent, or Firm—Crawford Maunu PLLC

(57) ABSTRACT

A method and apparatus for providing matched differential MR biasing and pre-amplification. Tightly matched and well centered low-level MR bias voltage is provided directly to the sensing element for controlled input-impedance differential pre-amplification without common-mode voltage level control with loops.

30 Claims, 5 Drawing Sheets

METHOD AND APPARATUS FOR PROVIDING MATCHED DIFFERENTIAL MR BIASING AND PRE-AMPLIFICATION

BACKGROUND OF THE INVENTION

1. Field of the Invention

This invention relates in general to magnetic storage systems, and more particularly to a method and apparatus for a method and apparatus for providing matched differential MR biasing and pre-amplification.

2. Description of Related Art

Magnetic recording systems that utilize magnetic disk and tape drives constitute the main form of data storage and retrieval in present-day computer and data processing systems. In the recording process, information is written and stored as magnetization patterns on the magnetic recording medium. Scanning a write head over the medium and energizing the write head with appropriate current waveforms accomplish this recording process. In a read-back process, scanning a read sensor over the medium retrieves the stored information. This read sensor intercepts magnetic flux from the magnetization patterns on the recording medium and converts the magnetic flux into electrical signals, which are then detected and decoded.

In high capacity storage systems, magnetoresistive read sensors, commonly referred to as MR heads, are the prevailing read sensor because of their capability to read data from a surface of a recording medium at greater track and linear densities than thin film inductive heads. An MR sensor detects a magnetic field through the change in resistance of its MR sensing layer (also referred to as an "MR element") as a function of the strength and direction of the magnetic flux being sensed by the MR layer.

The changes in resistance of the MR element in response to magnetic data recorded on a storage media surface is amplified in the read/write chip (also referred to as the arm electronics (AE) module) on the actuator arm before transmission to the external electronics. The frequency response of the pre-amplifier in the AE module, and in particular its high frequency bandwidth, determines the data rate capability of the disk drive. The high frequency bandwidth of the system comprising the MR element, pre-amplifier and interconnects is a function of the MR element resistance. MR element resistances generally have a range of values due to manufacturing variations and tolerances. The resistance of a single MR element may also change due to temperature or other conditions in the disk drive during manufacturing and use.

The present trend in the storage industry is ever increasing areal density which demands very efficiently designed small MR data sensing elements. This requires an improved power efficiency for the application of the MR head. The differential bias voltage across the element needs to be very low and the tolerance of the design to be accordingly small. For example, the bias voltage requirement can be as low as 50 m volts with 5% of tolerance. Centering of the differential bias voltage to the ground level is also very desirable for preventing extra current surging across the sensing element due to accidental contacts of the MR element to other voltage neutralized (grounded) parts within the storage device enclosure. Transient voltages developed across an MR element due to unstable voltages within the differential amplifier circuits should also be minimized for protection of the element. These unstable voltages can occur due to closed-loop transients of a commonly used Common-Mode control loop and its interactions with other amplification control loops, as implemented with many existing solutions. Minimized transient voltages are required to improve write-to-read transient recovery operations as well as for the protection of the MR heads.

Another goal is to concurrently provide controlled input impedance differential pre-amplification with the tightly controlled MR bias. Controlled and relatively low input impedance of an amplification circuit would reduce the effect of parasitic capacitance for limiting the bandwidth, and would match the source-end characteristic-impedance better in the flexible cable connection for the MR sensor which is generally a low resistance value. Furthermore, an efficient control of intrinsic noise in the signal amplification path without demanding extra power for lowering the source resistance of the gain stage is needed.

U.S. Pat. No. 5,701,213 presents a MR biasing circuit with a common-mode feedback control loop for an indirect setting and control of the bias voltage at the MR element. It can often cause unstable voltage transients in either common mode or differential mode due to loop transients or interactions with the gain stage control loop. The unstable voltages can induce extended time transients for Write to Read recovery and cause destruction to a power sensitive high-track-density MR head. U.S. Pat. No. 5,204,789 also uses a common-mode feedback loop. An open-loop MR biasing circuit is presented by U.S. Pat. No. 5,812,019 for a high impedance input MR amplification. U.S. Pat. No. 5,812,019 uses a pair of PNP transistors for establishing the bias, but the general PNP transistors in a BiCMOS IC processing have very poor beta (current gain), which will contribute more offset to the unmatched currents for establishing the bias. The use of unmatched currents for establishing the bias voltages can be also seen as in U.S. Pat. No. 5,856,891 for a high impedance input MR amplifier.

It can then be seen that there is a need for a method and apparatus for providing matched differential MR biasing and pre-amplification.

SUMMARY OF THE INVENTION

To overcome the limitations in the prior art described above, and to overcome other limitations that will become apparent upon reading and understanding the present specification, the present invention discloses a method and apparatus for providing matched differential MR biasing and pre-amplification.

The present invention solves the above-described problems by providing minimized transient voltages to improve write-to-read transient recovery operations as well as for the protection of the MR heads. Also, the present invention concurrently provides controlled input impedance differential pre-amplification with the tightly controlled MR bias.

A method in accordance with the principles of the present invention includes processing a MR bias control signal to generate reference voltages for application across a MR sensor, amplifying the reference voltages to produce a data output signal representing flux transitions detected by the MR sensor and filtering the data output signal to generate low bandwidth controlled feedback currents through the MR sensor.

In another embodiment of the present invention, a device for providing matched differential MR biasing and pre-amplification is provided. The device for providing matched differential MR biasing and pre-amplification includes an MR biasing and pre-amplification device for processing a MR bias control signal to generate reference voltages for application across an MR sensor, an amplifier, coupled to the MR biasing and pre-amplification device, for amplifying the reference voltages to produce a data output signal representing flux transitions detected by the MR sensor and a filter, coupled to the amplifier and the MR biasing and pre-amplification device, for filtering the data output signal to generate low bandwidth controlled feedback currents through the MR sensor.

In another embodiment of the present invention, a MR biasing and pre-amplification device is provided. The MR biasing and pre-amplification device includes an input stage for receiving MR bias control signals for generating the reference voltages, the input stage further including at least one compensation controlled current source for applying a controlled current to matched resistor pairs to generate the reference voltages in response to the MR bias control signals, a balanced bridge, coupled to the input stage, for level shifting the generated reference voltages, a differential pre-amplifier stage, coupled to the balanced bridge, for applying pre-amplification to the reference voltages prior to application across an MR sensor, the reference voltages being centered across the MR sensor and at least one high impedance current sources for supplying bias currents to the MR sensor, the at least one high impedance current source minimizing unstable transient voltages at terminals of the MR sensor, wherein the balanced bridge provides a low impedance and wherein the bias currents from the at least one high impedance current source is low-bandwidth controlled, the at least one high impedance current source providing a slower response via the low bandwidth control than the reference voltages for minimizing unstable transient voltages at the terminals of the MR sensor.

In another embodiment of the present invention, a magnetic storage system is provided. The magnetic storage system includes at least one moveable magnetic storage medium for storing data thereon, an actuator assembly having a magnetic sensor disposed at a distal end, the actuator assembly moving the magnetic sensor relative to the at least one moveable magnetic storage medium and a signal processor system, coupled to the magnetic sensor, for processing read and write signals to and from the magnetic sensor, the signal processor system comprising a device for providing matched differential MR biasing and pre-amplification, the device for providing matched differential MR biasing and pre-amplification further including a MR biasing and pre-amplification device for processing a MR bias control signal to generate reference voltages for application across an MR sensor, an amplifier, coupled to the MR biasing and pre-amplification device, for amplifying the reference voltages to produce a data output signal representing flux transitions detected by the MR sensor and a filter, coupled to the amplifier and the MR biasing and pre-amplification device, for filtering the data output signal to generate low bandwidth controlled feedback currents through the MR sensor.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

The present invention provides a method and apparatus for providing matched differential MR biasing and pre-amplification. The present invention provides minimized transient voltages to improve write-to-read transient recovery operations as well as for the protection of the MR heads. Also, the present invention concurrently provides controlled input impedance differential pre-amplification with the tightly controlled MR bias.

Figure 1:
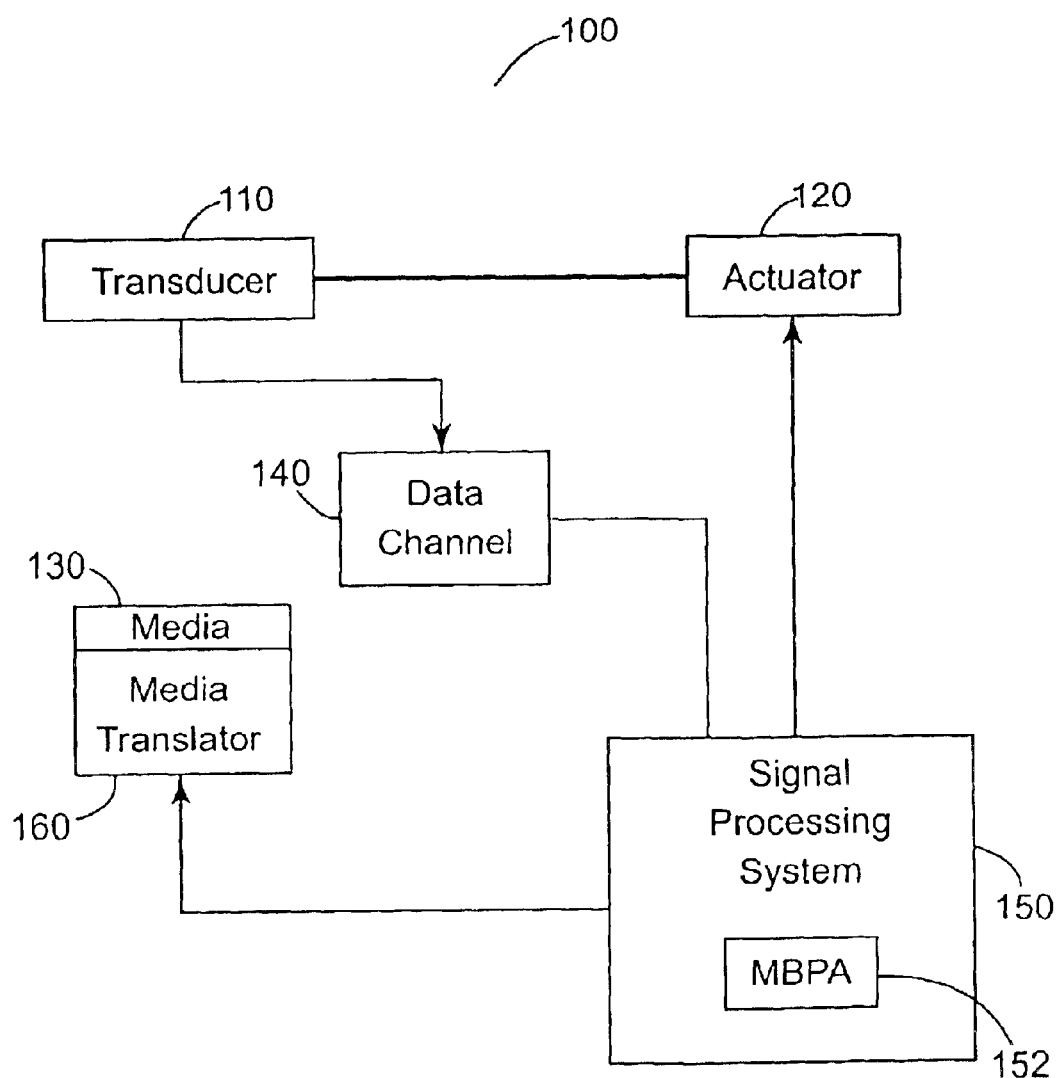
FIG. 1 illustrates a storage system according to the present invention.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. More particularly, the signal processor system 150 includes a device for providing matched differential MR biasing and pre-amplification 152 according to the present invention. Nevertheless, the present invention is not meant to be limited to a particular type of storage system 100 or to the type of media 130 used in the storage system 100.

Figure 2:
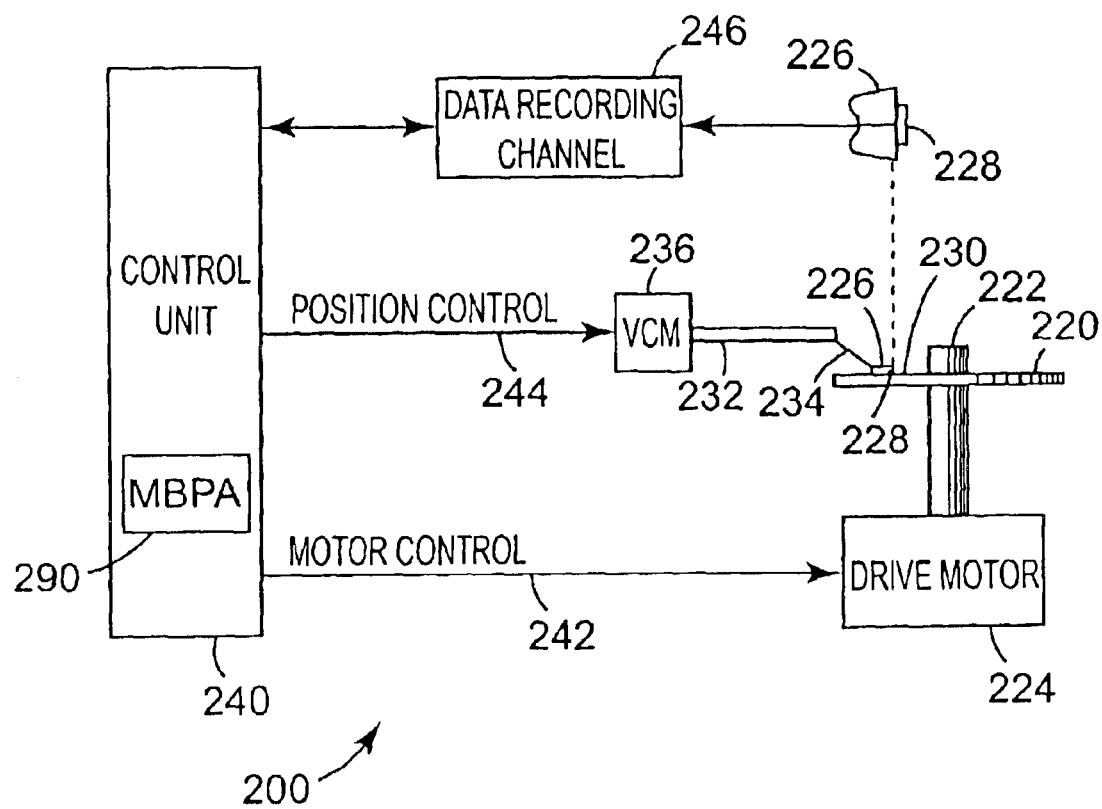
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228. As the disk(s) 220 rotate, slider 226 is moved radially in and out over disk surface 230 so that heads 228 may access different portions of the disk 220 where desired data is recorded. Each slider 226 is attached to an actuator arm 232 by means of a suspension 234. The suspension 234 provides a slight spring force, which biases slider 226 toward the disk surface 230. Each actuator arm 232 is attached to an actuator 236. The actuator 236 may be a voice coil motor (VCM). The VCM has a coil movable within a fixed magnetic field, the direction and speed of the coil movements being controlled by motor current signals supplied by a control unit 240.

During operation of the disk drive 200, the rotation of the disk 220 generates an air bearing between slider 226 and the disk surface 230, which exerts an upward force or lift on the slider 226. The surface of the slider 226, which includes head 228 and faces the surface of disk 220, is referred to as an air-bearing surface (ABS). The air bearing thus counterbalances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as drive motor control signals on line 242 and head position and seek control signals on line 244. The control signals on line 244 provide the desired current profiles to optimally move and position the slider 226 to the desired data track on the disk 220. Read and write signals are communicated to and from read/write heads 228 through recording channel 246. More particularly, the control unit 240 in accordance with the present invention may include a device for providing matched differential MR biasing and pre-amplification 290 according to the present invention.

The above description of a typical magnetic disk drive storage system 200 is provided for representation purposes only. It should be apparent that disk storage systems may contain a large number of disks and actuators, and that each actuator may support a number of sliders. Many other variations of the basic typical magnetic disk drive storage system 200 may be used in conjunction with the present invention while keeping within the scope and intention of the invention. However, those skilled in the art will recognized that the present invention is not meant to be limited to magnetic disk drive storage systems as illustrated in FIG. 2.

Figure 3:
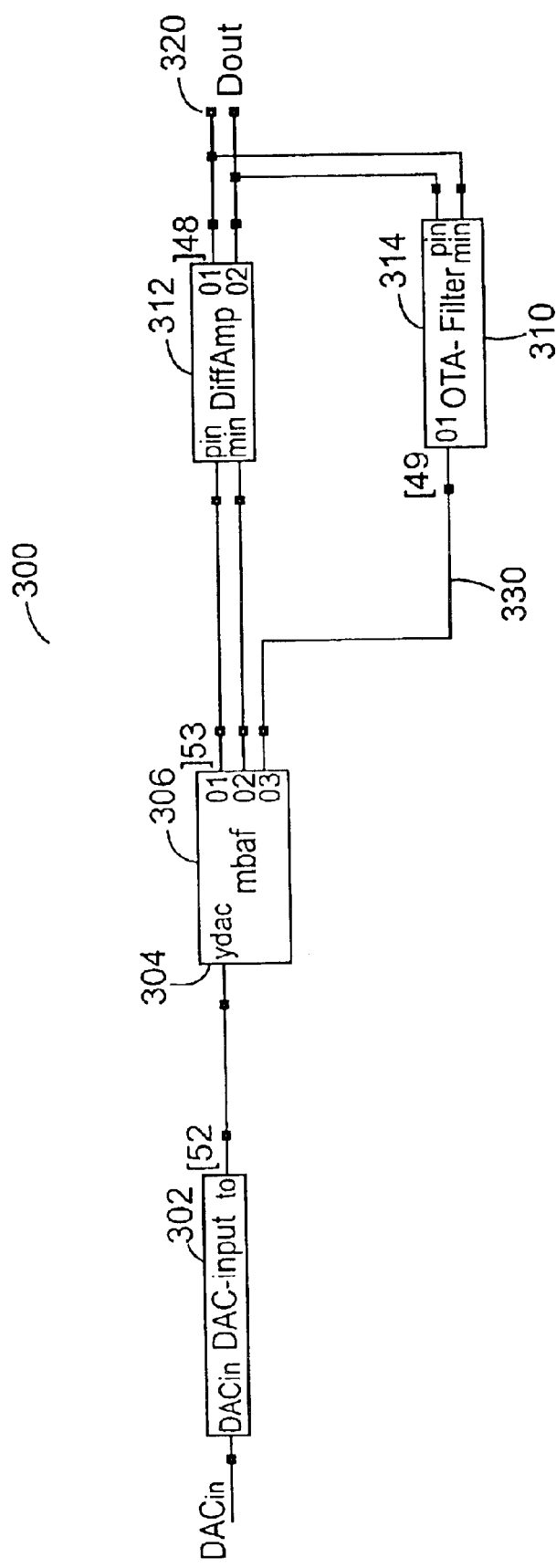
FIG. 3 illustrates a circuit block diagram of a device for providing matched differential MR biasing and pre-amplification according to the present invention.

FIG. 3 illustrates a circuit block diagram of a device for providing matched differential MR biasing and pre-amplification 300 according to the present invention. A digital-to-analog converter (DAC) input circuit 302 provides a command of bias voltage changes through the DAC current input 304 of a MR biasing and pre-amplification circuit 306. The MR biasing and pre-amplification circuit 306 provides a well centered low-level differential MR bias to the MR head. Sense voltages are then provided to a control loop 310, which includes a differential amplifier (DiffAmp) 312 and an OTA-filter circuit 314. The control loop 310 rejects the MR dc bias as well as any low frequency disturbances. The sensed voltages from the MR biasing and pre-amplification circuit 306 are amplified and provided as data output 320. The data output signal 320 is processed by the OTA filter 314, which then provides a signal 330 for controlling low bandwidth feedback currents through the MR resistor at the MR biasing and pre-amplification circuit 306 for completing the signal amplification.

Figure 4:
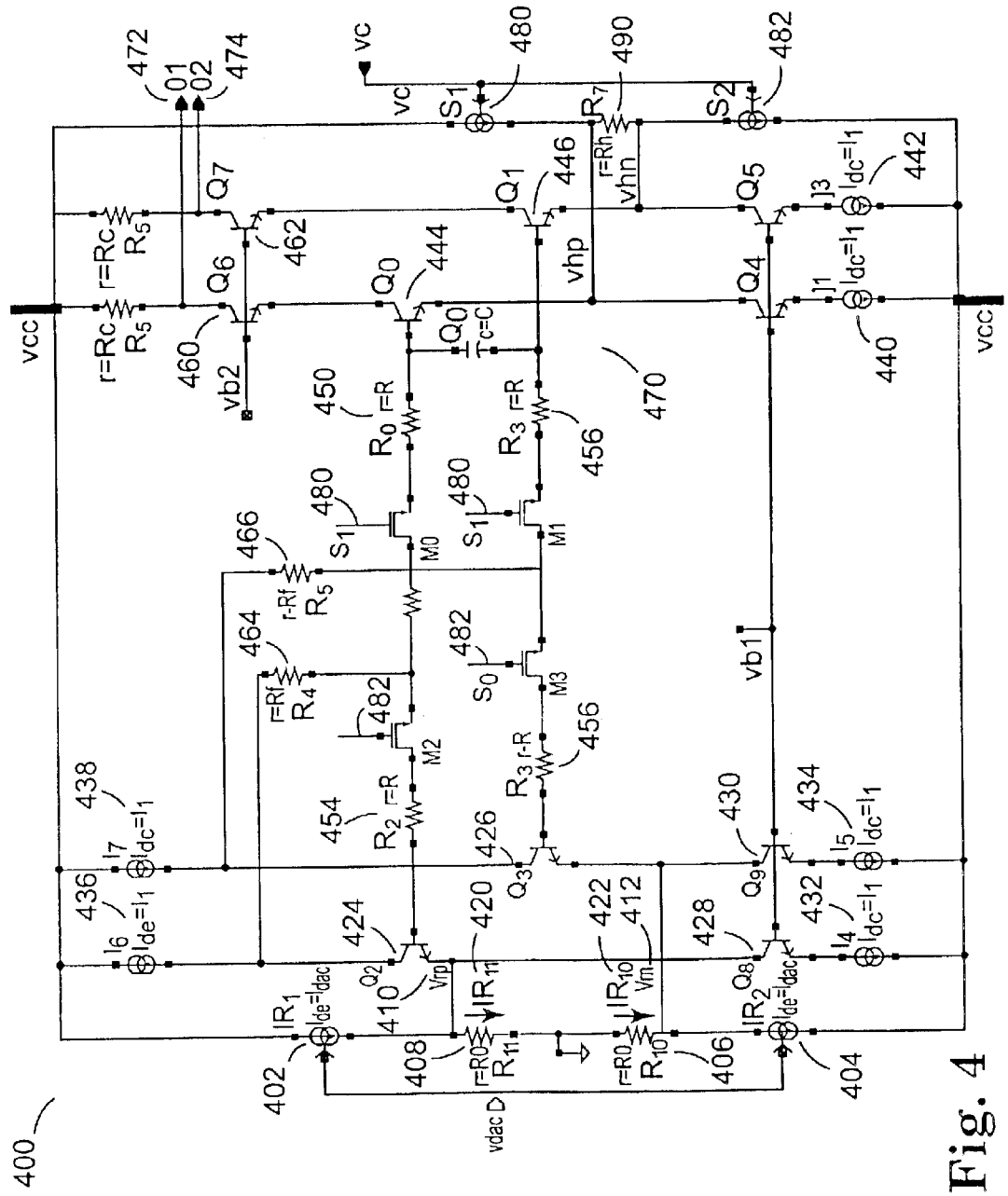
FIG. 4 illustrates a detailed circuit diagram of a MR biasing and pre-amplification circuit according to the present invention.

FIG. 4 illustrates a detailed circuit diagram of a MR biasing and pre-amplification circuit 400 according to the present invention. In FIG. 4, the output currents of $IR_1$ (Idac) 402 and $IR_2$ (Idac) 404 are applied to the matched resistors of $R_{10}$ 406 and $R_{11}$ 408 to generate the reference voltages of Vrp 410 and Vrn 412. Controlled-currents $IR_{11}$ 420 and $IR_{10}$ 422 could be undesirably changed by the emitter currents of $Q_2$ 424 and $Q_3$ 426 and also the collector currents of $Q_8$ 428 and $Q_9$ 430 respectively, without a means to compensate for any undesirable change. Therefore, the MR biasing and pre-amplification circuit 400 according to the present invention provides a current compensation function, as will be described below, for stabilizing control currents $IR_{11}$ 420 and $IR_{10}$ 422.

The currents of $I_4$ 432, $I_5$ 434, $I_6$ 436 and $I_7$ 438 for supplying of $Q_2$ 424, $Q_3$ 426, $Q_8$ 428 and $Q_9$ 430 are generated by a FET current mirror circuit (not shown) and are mirrored back from the pre-amplifier stage currents of $I_1$ 440 and $I_3$ 442. The currents of $I_1$ 440 and $I_3$ 442 are equally generated with a tightly controlled reference circuit, such as a bandgap reference.

The voltages Vrp 410 and Vrn 412 are level-shifted by a balanced bridge circuit. The matched transistors $Q_0$ 444, $Q_1$ 446, $Q_2$ 424 and $Q_3$ 426 with matched resistors $R_0$ 450, $R_1$ 452, $R_2$ 454 and $R_3$ 456 form the balanced bridge to supply voltage bias directly at the MR head without any closed loop controls. The transistors $Q_0$ 444 and $Q_1$ 446 also serve as the differential amplification pair for the cascode gain stage with a cascode transistor pair of $Q_6$ 460 and $Q_7$ 462. The balanced-bridge circuit is stabilized with the shunt feedback and current compensation resistors of $R_4$ 464 and $R_5$ 466.

In this balanced and matched MR bias and pre-amplification circuit, the DAC input currents of Idac (i.e., $IR_1$ 402 and $IR_2$ 404) through the resistors $R_{10}$ 406 and $R_{11}$ 408 are thus compensated with emitter current of $Q_2$ 424 ($Ie_2$), the collector current of $Q_8$ 428 ($Ic_8$), the emitter current of $Q_3$ 426 ($Ie_3$) and the collector current of $Q_9$ 430 ($Ic_9$) as can be seen from the following:

$$Ie_2 = Ic_2 + Ib_2 = (I_1 - 2*Ib_2) + Ib_2 = I_1 - Ib;\ Ie_3 = Ic_3 + Ib_3 = (I_1 - 2*Ib_3) + Ib_3 = I_1 - Ib;$$

$$Ic_8 = I_1 - Ib_8 = I_1 - Ib;\ \text{and}\ Ic_9 = I_1 - Ib_9 = I_1 - Ib,$$

so the compensated currents of $IR_{10}$ and $IR_{11}$ are:

$$IR_{11} = Idac + Ie_2 - Ic_8 = Idac + (I_1 - Ib) - (I_1 - Ib) = Idac;\ \text{and}$$

$$IR_{10} = Idac + Ie_3 - Ie_9 = Idac + (I_1 - Ib) - (I_1 - Ib = Idac.$$

These compensated currents produce the very well centered reference voltages of Vrp 410 and Vrn 412, which are:

$$Vrp = Idac * R_0\ \text{and}\ Vrn = -Idac * R_0\ \text{with}\ |Vrp| = |Vrn|.$$

Thus, the circuit utilizes a current compensation function for establishing of the reference voltages, and provides a balanced and matched voltage bridge with transistors of the same type (e.g., NPN) in a unique localized shunt resistive stabilization structure. A well centered low-level differential MR bias with a good tolerance can be obtained with the MR biasing and pre-amplification circuit 400 according to the present invention. The $V_{be}$ matching of transistor pairs can be generally obtained within 1 mV in a typical analog IC processing. Also the matched and mirrored currents from the gain stage are now used for the current compensation as explained supra.

The well centered reference voltages are directly applied to the MR element terminals with the balanced bridge circuit. The pre-amplification differential transistors $Q_0$ 444 and $Q_1$ 446 serve as bias source transistors as well. The RC network 470 at the base of the differential pre-amplifier pair $Q_0$ 444, $Q_1$ 446 is intended to be used as a bias voltage filter and for an AC compensation of the differential gain stage circuit.

This ac compensation helps in lowering the ac impedance of the MR biasing and pre-amplification circuit 400 according to the present invention to a prescribed and desirable level, and reduces the intrinsic noise associated with the transistors and related parasitic devices without needing to have applied extra dc currents for biasing the amplifier circuit. The main purpose of the cascode transistors $Q_6$ 460 and $Q_7$ 462 is for providing a bandwidth enhancement to reduce the Miller capacitance effect. The switches $S_1$ 480 are used for switching of the bias bridge to engage with other amplification stages of other MR heads within the disk drive. The switches $S_0$ 482 serve a balancing function to match the $S_1$ switches 480. The offset voltages created due to resistors $R_0$ 450, $R_1$ 452, $R_2$ 454 and $R_3$ 456 within the bridge are also matched in this structure.

Referring to both FIGS. 3 and 4, the dc differential MR bias voltage is rejected by a low bandwidth control loop 310 at the output of the pre-amplifier circuit 306. The voltage at the collectors 472, 474 of $Q_6$ 460 and $Q_7$ 462 are sensed, amplified and filtered by the DiffAmp 312 and OTA-filter 314 in FIG. 3 to provide low bandwidth controlled feedback currents ($IC_1$ 480 and $IC_2$ 482) through the MR resistor 490 for completing the signal amplification.

Figure 5:
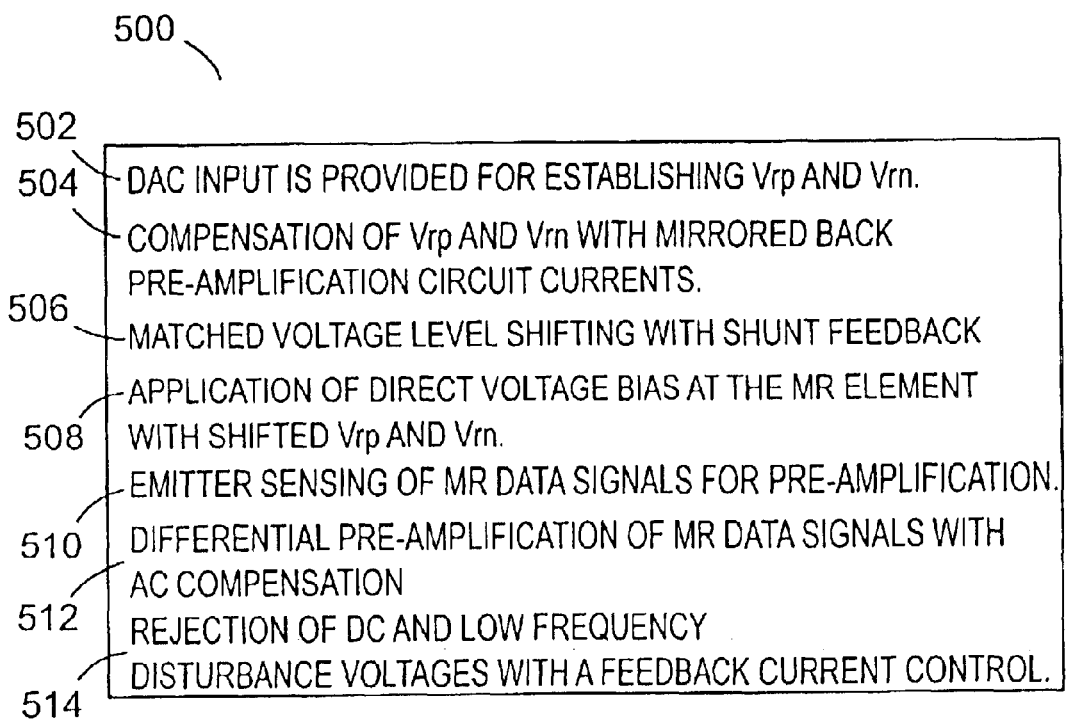
FIG. 5 illustrates the functions performed by the MR biasing and pre-amplification circuit according to the present invention.

FIG. 5 illustrates the functions 500 performed by the MR biasing and pre-amplification circuit according to the present invention. First, DAC input is provided for establishing Vrp and Vrn 502. Compensation of Vrp and Vrn with mirrored back pre-amplification circuit currents is provided 504. Matched voltage level shifting is provided with shunt feedback 506, the application of direct voltage bias at the MR element with shifted Vrp and Vrn 508, emitter sensing of MR data signals for pre-amplification 510, differential pre-amplification of MR data signals with ac compensation 512 and rejection of DC and low frequency disturbance voltages with a feedback current control 514 are also provided.

Accordingly, the present invention provides a balanced and compensated differential MR bias and pre-amplification structure. A tightly matched and well centered low-level MR bias voltage is provided directly to the sensing element associated with this circuit for controlled input-impedance differential pre-amplification. The direct application of the matched bias voltage at the emitter of the amplifying transistors does not require any common-mode voltage level control with loops. The bias currents from the high impedance current sources are supplied through the low-bandwidth control loop which responds much slower than the low impedance dominated bias voltage source with well defined voltage levels. Any unstable transient voltages at the terminals of the MR head can therefore be minimized. The well centered bias voltage also prevents extra current surging across the sensing element due to accidental contacts of the MR element to other voltage neutralized (grounded) parts within the disk enclosure.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing matched differential MR biasing and pre-amplification, comprising:
   processing a MR bias control signal to generate reference voltages for application across a MR sensor;
   amplifying the reference voltages to produce a data output signal representing flux transitions detected by the MR sensor; and
   filtering the data output signal to generate low bandwidth controlled feedback currents through the MR sensor.

2. The method of claim 1 wherein the MR bias control signal comprises an analog MR bias control signal, the method further comprising receiving a digital MR bias control signal and converting the digital MR bias control signal to the MR bias control signal.

3. The method of claim 1 wherein the filtering the data output signal comprises rejecting MR dc bias and low frequency disturbances in the data output signal.

4. The method of claim 1 wherein the processing a MR bias control signal to generate reference voltages for application across an MR sensor further comprises applying pre-amplification to the reference voltages.

5. The method of claim 4 wherein the filtering the data output signal to generate low bandwidth controlled feedback currents through the MR sensor further comprises supplying current compensation to the pre-amplification from high impedance current sources.

6. The method of claim 1 wherein the processing a MR bias control signal to generate reference voltages for application across an MR sensor further comprises creating compensation controlled currents that are applied to matched resistor pairs to provide stable current levels.

7. The method of claim 1 wherein the processing a MR bias control signal to generate reference voltages for application across an MR sensor further comprises level shifting the reference voltages using a balanced bridge for stabilization.

8. The method of claim 7 further comprising providing shunt feedback and current compensation to the balanced bridge.

9. The method of claim 7 further comprising providing bias voltage filtering and AC compensation using an RC network at a base of a differential pre-amplifier.

10. The method of claim 1 wherein the processing a MR bias control signal to generate reference voltages for application across an MR sensor further comprises generating a centered low-level MR bias voltage to the MR sensor.

11. The method of claim 1 wherein the processing a MR bias control signal further comprises supplying bias currents from the high impedance current sources through the low-bandwidth control loop for minimizing unstable transient voltages at the terminals of the MR sensor.

12. The method of claim 1 wherein the processing a MR bias control signal further comprises compensating the reference voltages with mirrored back pre-amplification circuit currents.

13. A device for providing matched differential MR biasing and pre-amplification, comprising:
   an MR biasing and pre-amplification device for processing a MR bias control signal to generate reference voltages for application across an MR sensor;
   an amplifier, coupled to the MR biasing and pre-amplification device, for amplifying the reference voltages to produce a data output signal representing flux transitions detected by the MR sensor; and
   a filter, coupled to the amplifier and the MR biasing and pre-amplification device, for filtering the data output signal to generate low bandwidth controlled feedback currents through the MR sensor.

14. The device of claim 13 further comprising a digital-to-analog converter for receiving a digital MR bias control signal and converting the digital MR bias control signal to the MR bias control signal.

15. The device of claim 13 wherein the filter rejects MR dc bias and low frequency disturbances in the data output signal.

16. The device of claim 13 wherein the MR biasing and pre-amplification device further comprises a pre-amplifier stage for applying pre-amplification to the reference voltages prior to application across the MR sensor.

17. The device of claim 13 wherein the filter generates a signal for supplying current compensation from high impedance current sources at terminals of the MR sensor.

18. The device of claim 13 wherein the MR biasing and pre-amplification device generates the reference voltages by creating compensation controlled currents that are applied to matched resistor pairs, the matched resistor pairs providing stable current levels.

19. The device of claim 13 wherein the MR biasing and pre-amplification device further comprises a balanced bridge for level shifting the generated reference voltages.

20. The device of claim 19 wherein the balanced bridge comprises matched components for providing stabilization to the reference voltages.

21. The device of claim 19 wherein the MR biasing and pre-amplification device further comprises shunt feedback resistors for providing current compensation to the balanced bridge.

22. The device of claim 19 wherein the balanced bridge further comprises an RC network at a base of a differential pre-amplifier to provide a bias voltage filter and for providing AC compensation of the differential pre-amplifier.

23. The device of claim 19 wherein the balanced bridge further comprises a first set of switches for switching of the bias bridge to engage with other amplification stages of another MR sensor and a second set of switches for balancing the first set of switches.

24. The device of claim 13 wherein MR biasing and pre-amplification device further comprises a differential pre-amplifier stage, the reference voltages being centered across the differential pre-amplifier stage.

25. The device of claim 13 wherein the MR biasing and pre-amplification device further comprises high impedance current sources for supplying bias currents for minimizing unstable transient voltages at terminals of the MR sensor.

26. The device of claim 13 wherein the MR biasing and pre-amplification device further comprises a pre-amplifier for providing mirrored back currents for compensating the reference voltages.

27. An MR biasing and pre-amplification device, comprising
an input stage for receiving MR bias control signals for generating the reference voltages, the input stage further including at least one compensation controlled current source for applying a controlled current to matched resistor pairs to generate the reference voltages in response to the MR bias control signals;
a balanced bridge, coupled to the input stage, for level shifting the generated reference voltages;
a differential pre-amplifier stage, coupled to the balanced bridge, for applying pre-amplification to the reference voltages prior to application across an MR sensor, the reference voltages being centered across the MR sensor; and
at least one high impedance current sources for supplying bias currents to the MR sensor, the at least one high impedance current source minimizing unstable transient voltages at terminals of the MR sensor;
wherein the balanced bridge provides a low impedance and wherein the bias currents from the at least one high impedance current source is low-bandwidth controlled, the at least one high impedance current source providing a slower response via the low bandwidth control than the reference voltages for minimizing unstable transient voltages at the terminals of the MR sensor.

28. The MR biasing and pre-amplification device of claim 27 wherein the balanced bridge comprises matched components for providing stabilization to the reference voltages.

29. The MR biasing and pre-amplification device of claim 27 further comprising shunt feedback resistors for providing current compensation to the balanced bridge.

30. A magnetic storage system, comprising:
at least one moveable magnetic storage medium for storing data thereon;
an actuator assembly having a magnetic sensor disposed at a distal end, the actuator assembly moving the magnetic sensor relative to the at least one moveable magnetic storage medium; and
a signal processor system, coupled to the magnetic sensor, for processing read and write signals to and from the magnetic sensor, the signal processor system comprising a device for providing matched differential MR biasing and pre-amplification, the device for providing matched differential MR biasing and pre-amplification further comprising:
a MR biasing and pre-amplification device for processing a MR bias control signal to generate reference voltages for application across an MR sensor;
an amplifier, coupled to the MR biasing and pre-amplification device, for amplifying the reference voltages to produce a data output signal representing flux transitions detected by the MR sensor; and
a filter, coupled to the amplifier and the MR biasing and pre-amplification device, for filtering the data output signal to generate low bandwidth controlled feedback currents through the MR sensor.

* * * * *